(12) United States Patent
Osaragi et al.

(10) Patent No.: US 7,081,606 B2
(45) Date of Patent: Jul. 25, 2006

(54) POSITION MEASURING SYSTEM (75) Inventors: Kazuki Osaragi, Itabashi-ku (JP);
Kunihiro Hayashi, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 11/096,650

(22) Filed: Apr. 1, 2005

(65) Prior Publication Data
US 2005/0274879 A1  Dec. 15, 2005

(30) Foreign Application Priority Data
Jun. 15, 2004  (JP) ............................. 2004-177256

(51) Int. Cl.
*G01C 21/02* (2006.01)

(52) U.S. Cl. ............................... 250/206.1; 356/141.1; 172/4.5

(58) Field of Classification Search ............ 250/206.2, 250/559.29, 206.1; 172/4.5; 356/141.1, 356/141.2, 141.3, 141.4, 141.5
See application file for complete search history.

(56) References Cited

U.S. PATENT DOCUMENTS

| | | | | |
|---|---|---|---|---|
| 6,068,060 | A * | 5/2000 | Ohtomo et al. | 172/4.5 |
| 6,286,607 | B1 * | 9/2001 | Ohtomo et al. | 172/4.5 |
| 6,435,283 | B1 * | 8/2002 | Ohtomo et al. | 172/4.5 |
| 6,443,235 | B1 * | 9/2002 | Ohtomo et al. | 172/4.5 |
| 6,450,267 | B1 * | 9/2002 | Ohtomo et al. | 172/4.5 |
| 2001/0023766 | A1 * | 9/2001 | Ohtomo et al. | 172/4.5 |
| 2002/0027007 | A1 * | 3/2002 | Ohtomo et al. | 172/2 |
| 2003/0136901 | A1 * | 7/2003 | Ohtomo et al. | 250/234 |
| 2003/0137658 | A1 * | 7/2003 | Ohtomo et al. | 356/141.4 |

* cited by examiner

*Primary Examiner*—Thanh X. Luu (74) *Attorney, Agent, or Firm*—Nields & Lemack (57) ABSTRACT

A position measuring system, comprising a rotary laser system having a projection optical system provided at a known point and for projecting a laser beam with a spreading angle in an up-to-bottom direction by rotary irradiation and a photodetection optical system for guiding a reflection light of the laser beam toward an image photodetector, an object having a reflecting body to reflect the laser beam toward the rotary laser system, a GPS position measuring unit for obtaining a position of the object, and a control arithmetic operation unit for calculating an elevation angle with respect to the object from a photodetecting position of the reflection light on the image photodetector and for calculating a position and a height of the object based on position information of the rotary laser system, position information from the GPS position measuring unit and based on the elevation angle.

5 Claims, 7 Drawing Sheets

POSITION MEASURING SYSTEM

BACKGROUND OF THE INVENTION

The present invention relates to a position measuring system for measuring a position such as a working position based on photodetecting condition of a laser beam by projecting the laser beam in rotary irradiation and by receiving the laser beam reflected by an object.

In the past, as a representative system for forming a reference plane by projecting a laser beam in rotary irradiation, a rotary laser system and a photodetection system for receiving the laser beam have been known.

The rotary laser system is designed to form a reference plane by projecting a laser beam with luminous flux in spot-like shape. For instance, by projecting the laser beam within a horizontal plane by rotary irradiation, a horizontal reference plane is formed. By projecting the laser beam within a vertical plane by rotary irradiation, a vertical reference plane is formed. By projecting the beam within a tilted plane by rotary irradiation, a tilted reference plane is formed.

The photodetection system comprises a photodetection unit for receiving and detecting a laser beam. Based on the laser beam detected by the photodetection unit, a horizontal reference position, a vertical reference position, etc. are determined. The rotary laser system and the photodetection system can make up together a position measuring system. The position measuring system utilizing a reference plane formed by the laser beam is effective for the use in civil engineering work, which is carried out for a wide range of operation.

In case the position measuring system is used for wide range of outdoor operation as in the case of civil engineering work using construction machines, a reference plane is detected by the photodetection system installed on the construction machine. Based on the reference plane thus detected, a working position of the construction machine is measured. In this case, positioning range of the photodetection system with respect to the reference plane is also wider. When the photodetection unit is small, an operator has difficulty to perform manual operation, and the photodetection unit of larger size is used. For instance, in case the reference plane formed is a horizontal reference plane, the photodetection system sometimes has a photodetection unit of several tens of centimeters—sometimes more than 1 meter—in a vertical direction.

When a construction machine, which is represented by a bulldozer, is used, management of working on a plane is carried out by a combination of a rotary laser system and a photodetection system installed on the construction machine. When working condition of the construction machine is to be controlled, a GPS position measuring unit is added to this combination. Such system is operated for 3-dimensional working control including positions on the ground surface and a height. The position in a horizontal direction on the ground surface is detected by the GPS position measuring unit. For the detection of the position in the direction of height, the rotary laser system and the photodetection system are used for stabilizing purposes.

Figure 8:
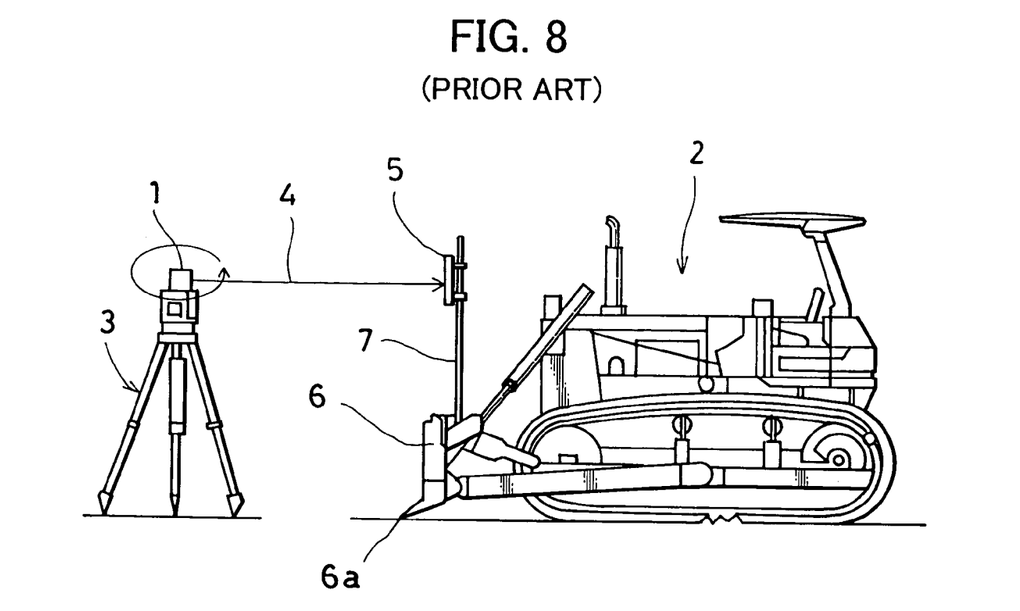
FIG. 8 is a drawing to explain a conventional type position measuring system.

FIG. 8 shows a conventional type working position measuring system when a photodetection system is installed on a construction machine.

In the figure, reference numeral 1 denotes a rotary laser system, and 2 denotes a construction machine (a bulldozer is shown in the figure). The rotary laser system 1 is fixed on a tripod 3, which is set up at a position as required. A reference plane is formed by a laser beam 4 projected from the rotary laser system 1. A photodetector 5 is fixed on a working tool of the bulldozer 2—for instance, on a mounting pole 7 erected on a blade 6. A distance from a ground surface at the position as required to the reference plane is a known value. If a distance from the reference position of photodetection of the photodetector 5 to the position of a blade edge 6a of the blade 6 is known, it is possible to carry out leveling work as a planned plane when operation for development is performed so that the photodetecting position of the laser beam 4 of the photodetector 5 is maintained at a predetermined position.

Figure 9:
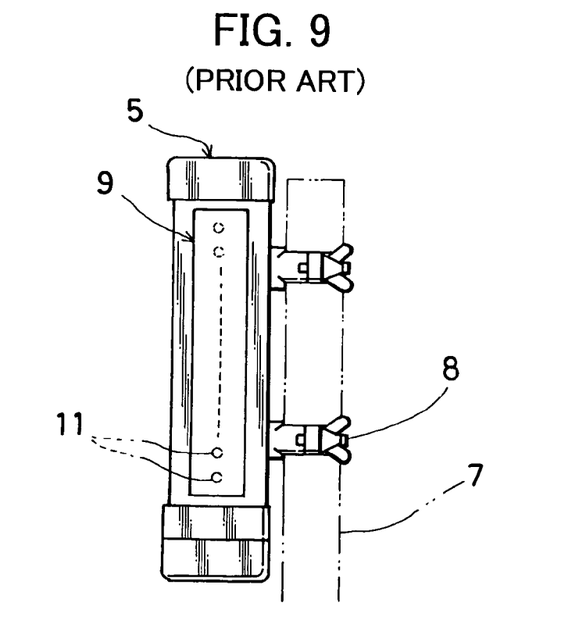
FIG. 9 is a drawing to explain a photodetector in the conventional type position measuring system.

FIG. 9 shows the photodetector 5 used on the bulldozer 2.

The photodetector 5 is fixed on the mounting pole 7 by using a pole clamp 8. A photodetection unit 9 is provided on the photodetector 5. The photodetection unit 9 is composed by arranging a multiple of photodetection sensors 11 in a longitudinal direction. Among the photodetection sensors 11, a photodetection sensor 11, which is receiving the light, can be identified by a signal issued from the photodetection sensor 11 receiving the laser beam 4. Based on the position of the photodetection sensor 11, photodetecting position of the laser beam 4 can be detected.

When the ground surface at the working site is flattened or filled with soil according to the reference plane by using the bulldozer 2, ground leveling is often performed on topographical conditions, which are beyond the photodetection range of the photodetection unit 9. It is difficult to detect the light when a photodetector with photodetection range of about several tens of centimeters is used.

Because the blade 6 is moved up and down according to the topographical conditions, the photodetector 5 installed on the blade 6 is not sufficiently operated even when the photodetector 5 has a photodetection unit 9 with no less than a length of 300 mm, for instance. Therefore, to increase the photodetection range of the photodetection unit 9, it is often designed in such manner that the pole 7 can be extended or contracted and the photodetector 5 itself can be moved up and down.

However, a long photodetection unit 9 as described above comprises a multiple of short photodetection sensors 11, and it is disadvantageous because it is very expensive. Further, to move the photodetection unit 9 up and down, a complicated structure including a driving unit and a control unit to control the driving unit, etc. is required, and this means the increase of the cost.

A position measuring system using a photodetection unit with a photodetection sensor having a required length in a vertical direction is disclosed in the Japanese Patent Application Publication No. 11-256620.

SUMMARY OF THE INVENTION

It is an object of the present invention to provide a position measuring system, which has good workability, and which can detect a reference plane in simple manner and at low cost and can measure the reference plane.

To attain the above object, a position measuring system according to the present invention comprises a rotary laser system having a projection optical system provided at a known point and for projecting a laser beam with a spreading angle in an up-to-bottom direction by rotary irradiation and a photodetection optical system for guiding a reflection light of the laser beam toward an image photodetector, an object having a reflecting body to reflect the laser beam toward the rotary laser system, a GPS position measuring unit for obtaining a position of the object, and a control arithmetic operation unit for calculating an elevation angle with respect to the object from a photodetecting position of the reflection light on the image photodetector and for calculating a position and a height of the object based on position information of the rotary laser system, position information from the GPS position measuring unit and based on the elevation angle. Also, the present invention provides the position measuring system as described above, wherein the rotary laser system has a first data transmitter/receiver, the object has a second data transmitter/receiver, the elevation angle is calculated between the first data transmitter/receiver and the second data transmitter/receiver, position information of the rotary laser system, position information from the GPS position measuring unit and information for calculating the position and the height of the object based on the elevation angle can be transmitted and received between the first data transmitter/receiver and the second data transmitter/receiver, at least one of the rotary laser system and the object has a control arithmetic operation unit, and the position and the height of the object are calculated by the control arithmetic operation unit. Further, the present invention provides the position measuring system as described above, wherein the object is a construction machine, and the GPS position measuring unit is provided on the construction machine, and a working position of the construction machine is obtained. Also, the present invention provides the position measuring system as described above, wherein the object is two or more construction machines, the rotary laser system has a rotary encoder for detecting an angle in the projecting direction of the laser beam, and the construction machines can be individually identified based on a detection signal of the rotary encoder. Further, the present invention provides the position measuring system as described above, wherein the signal transmitted and received between the first data transmitter/receiver and the second data transmitter/receiver has an identification data, and construction machines can be individually identified based on the identification data.

According to the present invention, a position measuring system is provided, which comprises a rotary laser system having a projection optical system provided at a known point and for projecting a laser beam with a spreading angle in an up-to-bottom direction by rotary irradiation and a photodetection optical system for guiding a reflection light of the laser beam toward an image photodetector, an object having a reflecting body to reflect the laser beam toward the rotary laser system, a GPS position measuring unit for obtaining a position of the object, and a control arithmetic operation unit for calculating an elevation angle with respect to the object from a photodetecting position of the reflection light on the image photodetector and for calculating a position and a height of the object based on position information of the rotary laser system, position information from the GPS position measuring unit and based on the elevation angle. As a result, there is no need to align the position of a reflecting body of the object with the projecting position of the laser beam. The laser beam can easily enter the reflecting body and the structure of a supporting unit of the reflecting body can be designed in simple manner.

The present invention provides a position measuring system, wherein the object is a construction machine, and the GPS position measuring unit is provided on the construction machine, and a working position of the construction machine is obtained. Thus, the working operation of the construction machine can be easily controlled under simple arrangement.

The present invention provides a position measuring system, wherein the object is two or more construction machines, the rotary laser system has a rotary encoder for detecting an angle in the projecting direction of the laser beam, and the construction machines can be individually identified based on a detection signal of the rotary encoder, and wherein the signal transmitted and received between the first data transmitter/receiver and the second data transmitter/receiver has an identification data, and construction machines can be individually identified based on the identification data. As a result, a plurality of construction machines can be operated and controlled by using a single rotary laser system. This makes it possible to compose a position measuring system at low cost.

DETAILED DESCRIPTION OF THE PREFERRED EMBODIMENTS

Description will be given below on the best mode of the invention for carrying out the present invention referring to the drawings.

Figure 1:
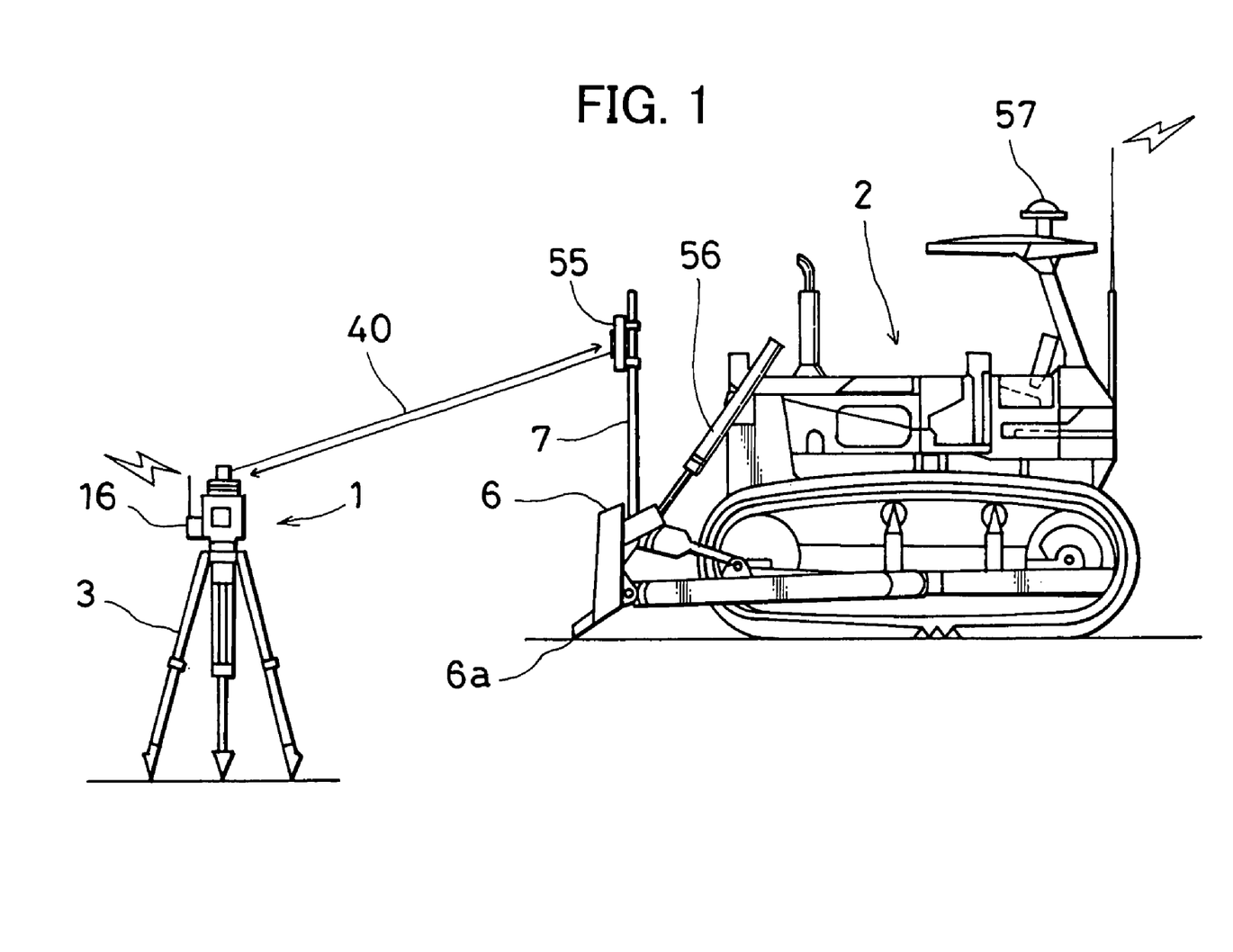
FIG. 1 is a drawing to explain a first embodiment of the present invention.

FIG. 1 shows a first embodiment of the present invention when a position measuring system of the present invention is applied as a position measuring system at a working site of civil engineering project.

Figure 2:
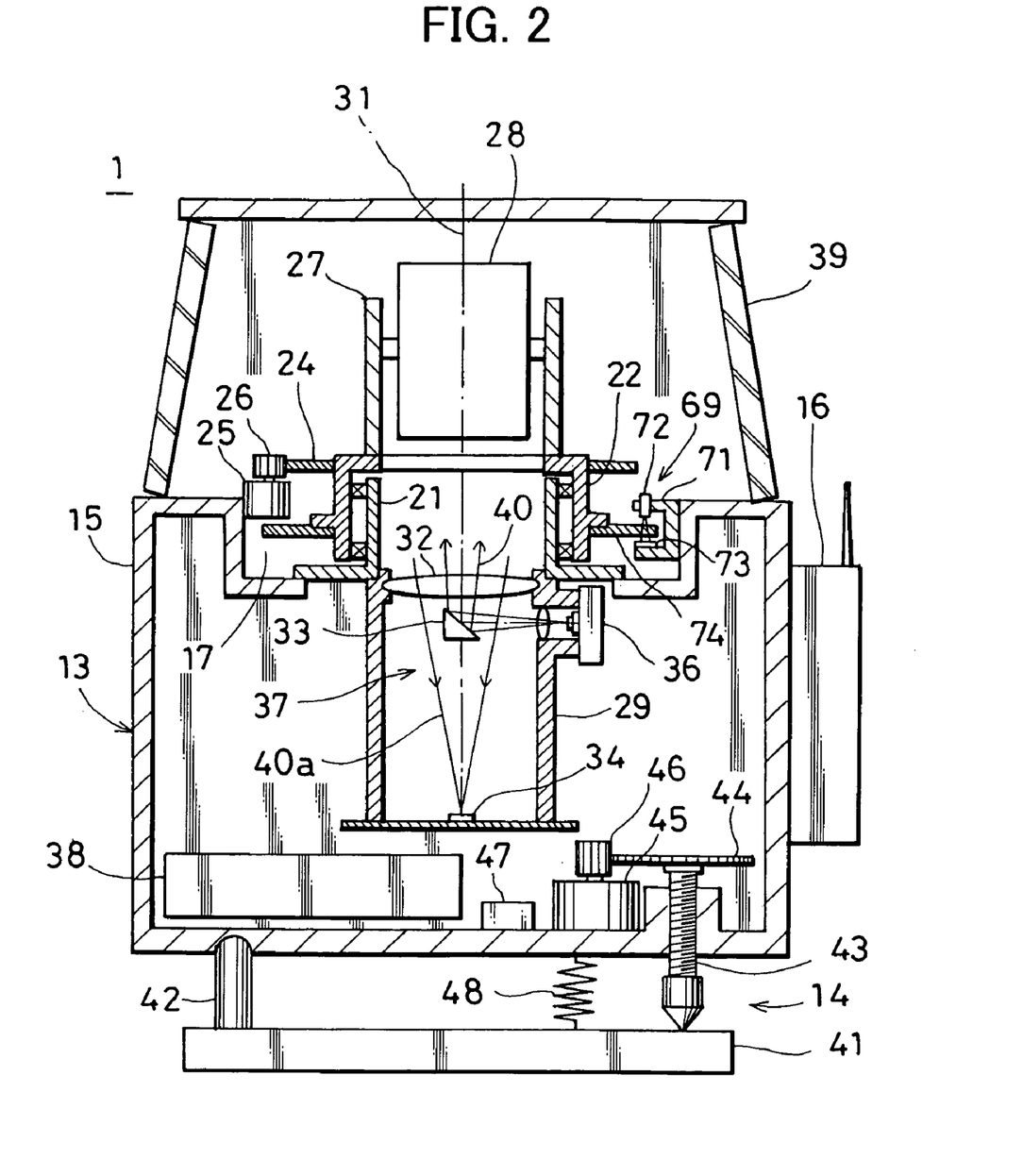
FIG. 2 is a cross-sectional view of a rotary laser system in the first embodiment of the present invention.
Figure 3:
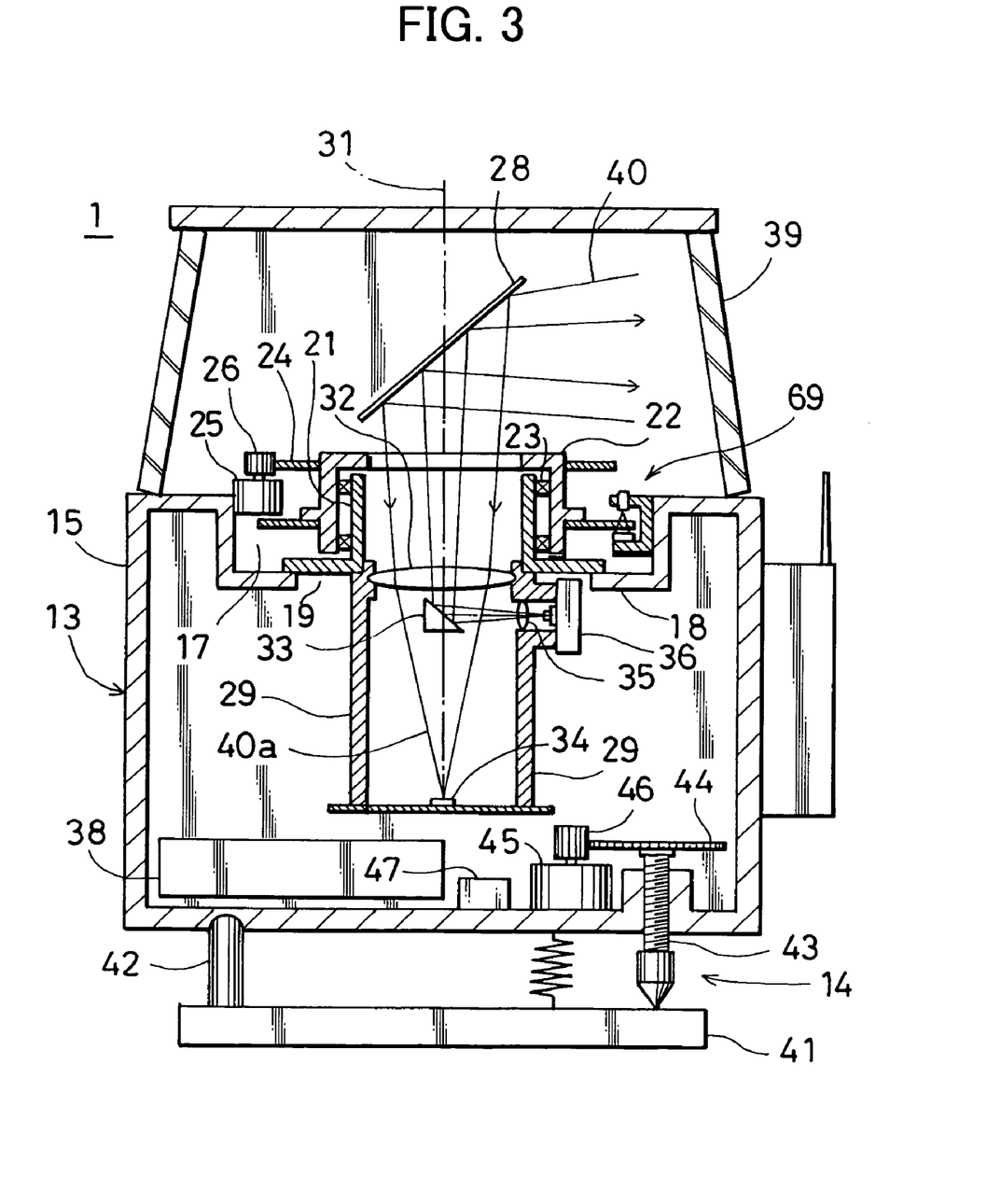
FIG. 3 is a cross-sectional view of the rotary laser system in the first embodiment of the present invention.

In FIG. 1, the same component shown in FIG. 8 is referred by the same symbol. In the figure, reference numeral 1 denotes a rotary laser system, and 2 denotes a bulldozer. The rotary laser system 1 is set up at a known position. The rotary laser system 1 is installed on a tripod 3 of several meters in height, for instance, or the rotary laser system 1 may be installed on a known structure, and height of the rotary laser system 1 is also already known. First, referring to FIG. 2 and FIG. 3, description will be given on the rotary laser system 1. FIG. 3 shows a condition where a reflection mirror 28 in FIG. 2 is rotated at an angle of 90°.

The rotary laser system 1 comprises a rotary laser system main unit 13, a leveling unit 14, and a data transmitter/receiver 16 provided on a main unit casing 15.

First, description will be given on the rotary laser system main unit 13.

A recessed portion 17 is provided on an upper surface of the main unit casing 15. On the recessed portion 17, a bore 19 is formed so that a flange 18 is arranged around the bore 19. A hollow shaft 21 with flange is mounted on the flange 18 concentrically with the bore 19. A rotating unit 22 is rotatably engaged on the hollow shaft 21 with flange via bearings 23.

On an upper end of the rotating unit 22, a driven gear 24 is engaged. A horizontal rotating motor 25 is arranged on a wall surface of the recessed portion 17 of the main unit casing 15. A driving gear 26 mounted on an output shaft of the horizontal rotating motor 25 is engaged with the driven gear 24.

A sensor holder 71 is fixed on the wall surface of the recessed portion 17. The sensor holder 71 is designed in concave shape with an opening portion directed toward the center of the rotary laser system 1. A light emitter 72 is provided on an eaves of the sensor holder 71. A photodetector 73 is provided on a bottom of the sensor holder 71 so that the photodetector 73 faces to the light emitter 72.

On the rotating unit 22, a pattern ring 74 is provided concentrically with the rotating unit 22, and the pattern ring 74 is designed in such manner that peripheral portion of the pattern ring 74 blocks between the light emitter 72 and the photodetector 73. The pattern ring 74 has a pattern being formed for detecting angles. When a light emitted from the light emitter 72 passes through the pattern ring 74 and is received by the photodetector 73, pulsed signals are issued for each predetermined angle. The light emitter 72, the pattern ring 74, and the photodetector 73 make up together a rotary encoder 69.

On an upper surface of the rotating unit 22, a bracket 27 is erected. The reflection mirror 28 is fixed on the bracket 27, and the reflection mirror 28 is tilted at an angle of 45° to a horizontal plane.

On a lower end of the hollow shaft 21 with flange, a body tube 29 is mounted concentrically with the hollow shaft with flange 21. Along a centerline 31 of the body tube 29, there are provided from above an objective lens 32, a small mirror 33, and an image photodetector 34. As the image photodetector 34, a photodetection element is used, which can identify a position in a photodetecting plane such as an image sensor, e.g., CCD or CMOS sensor, etc.

Along a reflection light optical axis of the small mirror 33, a condenser lens 35 and a tracking light emitter 36 having a light emitting element such as a semiconductor laser are arranged.

The objective lens 32, the small mirror 33, the image photodetector 34, the condenser lens 35, the tracking light emitter 36, a tracking detection circuit 50 (to be described later), etc. make up together a tracking detector 37. A tracking light 40 from the tracking light emitter 36 is projected by rotary irradiation via the reflection mirror 28. A reflection light 40a reflected by a reflection prism (See FIG. 1) of an object 55 is received by the image photodetector 34 via the reflection mirror 28 and the objective lens 32. The tracking light 40 is projected in a horizontal direction as a fan-shaped laser beam having a spreading angle in an up-to-bottom direction.

The small mirror 33, the objective lens 32, and the reflection mirror 28 make up together a projection optical system. The reflection mirror 28 and the objective lens 32 make up together a photodetection optical system.

Reference numeral 38 denotes a control unit provided with a power source unit such as battery.

On an upper surface of the main unit casing 15, there is provided a cover 39 for water-tightly covering the reflection mirror 28 and the horizontal rotating motor 25, etc. The cover 39 is made of a transparent material such as glass.

Next, the leveling unit 14 will be described.

A support pillar 42 is erected on a base 41. An upper end of the pillar 42 is designed in spherical surface, and the pillar 42 is tiltably engaged with a recess formed on a lower surface of the main unit casing 15. At two vertexes of a triangle, which has another vertex at the pillar 42, level adjusting screws 43 (only one of them is shown in the figure) are provided so as to be screwed into a bottom surface of the main unit casing 15, and a gear 44 is engaged with an upper end of the level adjusting screw 43. A spring 48 is stretched between the base 41 and the rotary laser system main unit 13, and the spring 48 gives resilient force so that the base 41 and the rotary laser system main unit 13 are pushed closer to each other. A level adjusting motor 45 is arranged on the bottom surface of the main unit casing 15. A pinion gear 46 is mounted on an output shaft of the level adjusting motor 45, and the pinion gear 46 is engaged with the gear 44. The level adjusting motor 45 is driven and controlled by the control unit 38. On the bottom surface of the main unit casing 15, a tilt sensor 47 is provided. The tilt sensor 47 detects tilting of the rotary laser system main unit 13, and the result of detection is sent to the control unit 38.

Figure 4:
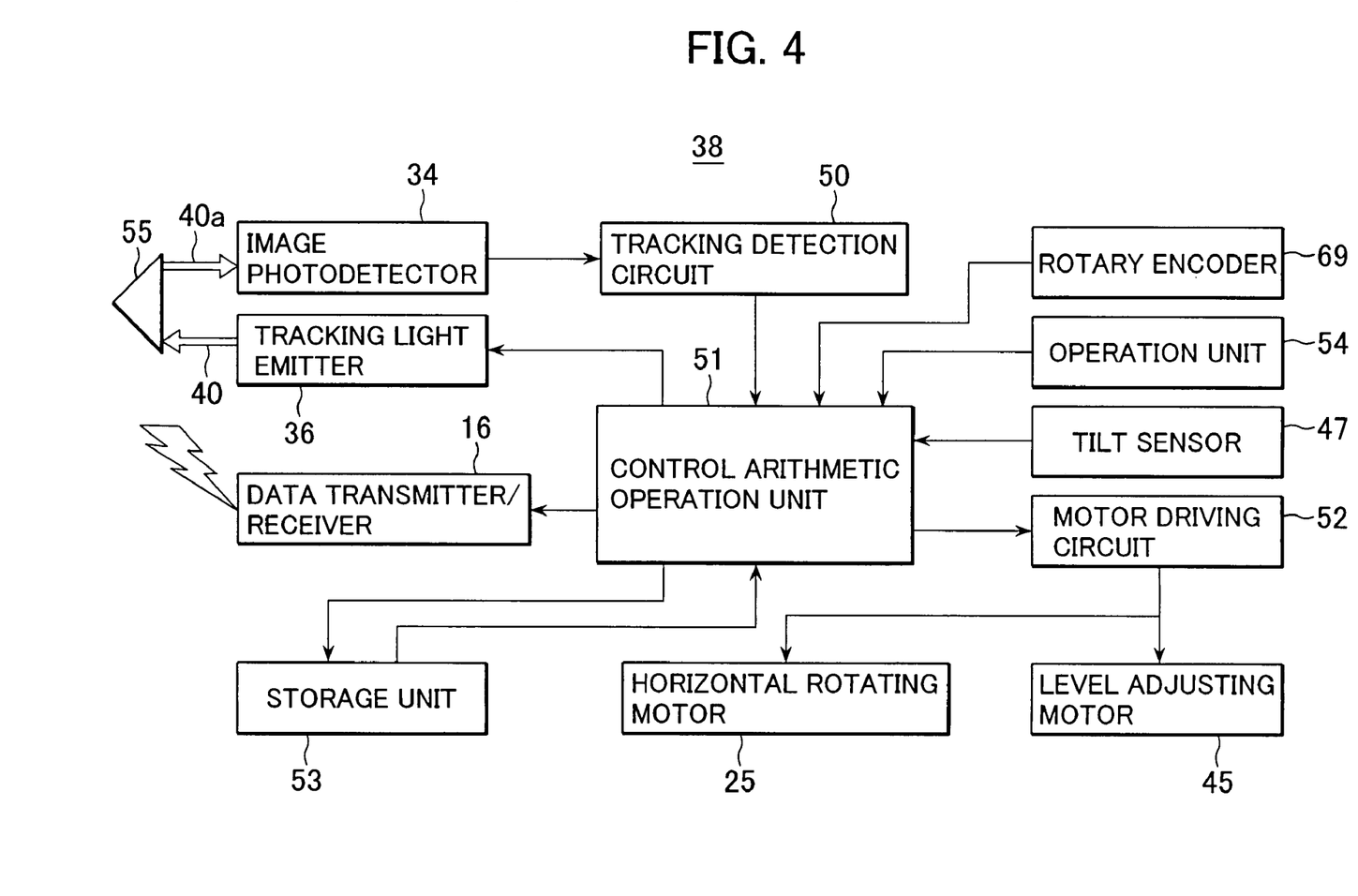
FIG. 4 is a block diagram of a control unit of the rotary laser system.

Referring to FIG. 4, description will be given on the control unit 38.

The control unit 38 comprises the data transmitter/receiver 16, the tilt sensor 47, the tracking detection circuit 50, and a control arithmetic operation unit (CPU) 51, a motor driving circuit 52 for driving the horizontal rotating motor 25 and the level adjusting motor 45, a storage unit 53 for rotary laser system, and an operation unit 54 removably mounted on the rotary laser system main unit 13. Based on a signal obtained at the image photodetector 34, the tracking detection circuit 50 detects an elevation angle with respect to the object 55 (FIG. 1) using the rotary laser system 1 as reference.

In the storage unit 53 for the rotary laser system, various programs necessary for operating the rotary laser system 1 are stored. These programs include: a compensation program for compensating a rotating image based on data of rotation angle from the rotary encoder 69, an operation program for rotating and projecting the laser beam, an operation program for leveling the rotary laser system main unit 13 based on a signal from the tilt sensor 47, and a transmission program for transmitting data to the bulldozer 2 and a calculating program, etc. Being mounted on the rotary laser system 1, the operation unit 54 can operate the rotary laser system 1. Or, the operation unit 54 may be removed from the rotary laser system 1, and the rotary laser system 1 can be operated by remote control.

The data transmitter/receiver 16 can transmit data on the elevation angle with respect to the object 55 obtained by rotary irradiation of the tracking light 40 and also data on the position of the rotary laser system 1 (position coordinates) to a control unit 59 (to be described later) of the bulldozer 2. As the transmitting method, both wireless communication and optical communication can be used.

Next, description will be given on general features of the bulldozer 2.

A mounting pole 7 is erected on the blade 6, and the object 55 is mounted on the mounting pole 7. The object 55 has a reflecting body, e.g. a reflection prism, and comprises a pole tilting sensor 62 (to be described later). When the tracking light 40 is projected, the reflection prism reflects the tracking light 40 to the rotary laser system 1, and the pole tilting sensor 62 can detect tilting of the mounting pole 7.

It will be suffice that the object 55 comprises at least a reflecting body. When the object 55 is mounted on the bulldozer 2 via the mounting pole 7, it is possible to integrate the object 55 with the bulldozer 2 and both can be newly recognized as an object.

A distance between the object 55 and the blade edge 6a is a known value. The driving of an actuator (e.g. a hydraulic cylinder 56) to move the blade 6 up and down is controlled by an excavation control unit (to be described later). The excavation control unit can calculate a relative height of the blade edge 6a with respect to a reference position of the bulldozer 2 (e.g. a pivotally mounted position of the hydraulic cylinder 56 on the bulldozer 2).

A GPS position measuring unit 57 is mounted on a predetermined position of the bulldozer 2, preferably on a position with an open upper space, such as a ceiling of a diver's compartment.

The bulldozer 2 comprises a control unit 59, which can calculate an actual working position by the blade 6 at real time or can carry out the work according to civil engineering working data.

Figure 6:
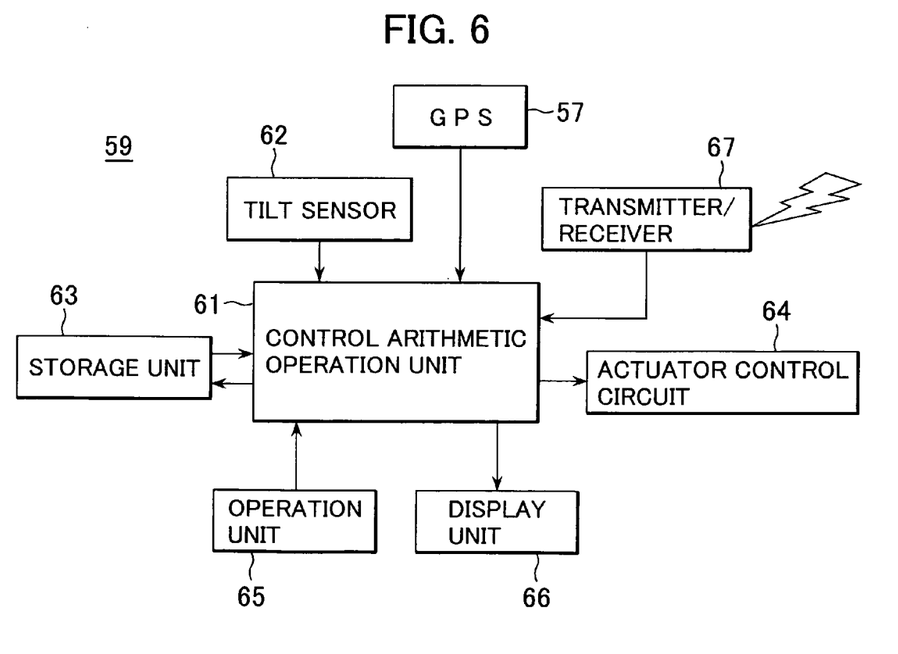
FIG. 6 is a block diagram of a control unit of a bulldozer in the first embodiment of the present invention.

Now, description will be given on the control unit 59 referring to FIG. 6.

The control unit 59 comprises a control arithmetic operation unit 61, the pole tilting sensor 62, a storage unit 63, an actuator control circuit 64, an operation unit 65, a display unit 66, a transmitter/receiver 67, etc.

In the storage unit 63, various data are stored. These data include: information on position, height, and elevation angle of the rotary laser system 1 transmitted from the rotary laser system 1, and information on position of the bulldozer 2 obtained at the GPS position measuring unit 57 and civil engineering working data, etc. Also, various programs are stored. The programs includes: a calculation program for calculating a distance between the rotary laser system 1 and the object 55 on plane coordinates and for calculating height of the object 55 from the elevation angle and calculating position on plane coordinates and height of the blade edge 6a, a communication program for performing data communication to and from the rotary laser system 1, and a control program for controlling the hydraulic cylinder 56 based on the civil engineering working data.

On the display unit 66, various data and information are displayed. For instance, these data and information include: an absolute position detected by the GPS position measuring unit 57, a position of the object 55 calculated based on the detection by the GPS position measuring unit 57, height of the object 55, height of the blade 6, information on position transmitted from the rotary laser system 1 and position on the working data in CG (computer graphics), etc.

Description will be given below on operation.

When the rotary laser system 1 is driven by the operation unit 54, the level adjusting motor 45 is driven by the control arithmetic operation unit 51 via the motor driving circuit 52. Based on a tilting detection signal from the tilt sensor 47, the rotary laser system main unit 13 is leveled in a horizontal direction.

The tracking light emitter 36 is driven, and the tracking light 40 is emitted. The tracking light 40 is reflected by the small mirror 33. Further, the tracking light 40 and is deflected in a horizontal direction by the reflection mirror 28, and projected. Then, the horizontal rotating motor 25 is driven, and the reflection mirror 28 is rotated around the centerline 31 via the driving gear 26 and the driven gear 24. By the rotation of the reflection mirror 28, the tracking light 40 with a spreading angle in an up-to-bottom direction is projected in rotation through the cover 39.

Because the tracking light 40 has a spreading angle in an up-to-bottom direction, there is no need to adjust the height of the object 55 even when there is a difference in elevation between the rotary laser system 1 and the bulldozer 2, and the tracking light 40 is projected to the object 55.

When the tracking light 40 is reflected by the object 55, a reflection light 40a enters the rotary laser system 1 via the reflection mirror 28. By the objective lens 32, the reflection light 40a is converged to the image photodetector 34.

In this case, the image is rotated by following the rotation of the reflection mirror 28 with respect to the image photodetector 34, and the rotation of the image is compensated according to the compensation program based on the detection angle of the rotary encoder 69. After the compensation, the elevation angle is determined based on the image.

Figure 5A:
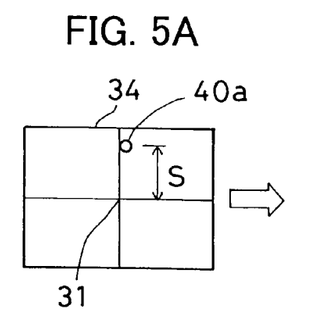
FIG. 5(A) and FIG. 5(B) each represents a drawing to show the relation between an image-forming position of a reflection light on an image photodetector and an elevation angle in the first embodiment of the present invention.
Figure 5B:
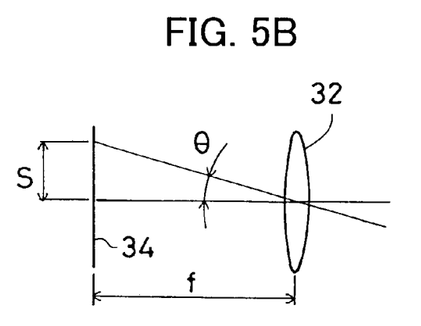

As shown in FIG. 5(A) an FIG. 5(B), if there is a difference in height between the object 55 and the rotary laser system 1, a converging position of the reflection light 40a is deviated by an amount of S from the centerline 31. If it is assumed that a distance between the image photodetector 34 and the objective lens 32 is "f", there exits the relationship of: $S = f \tan \theta$. The symbol $\theta$ exactly represents the elevation angle. Thus, by obtaining the value of S on the image photodetector 34 and the direction of deviation, the elevation angle $\theta$ of the object 55 can be obtained promptly.

The information such as the elevation angle $\theta$ and coordinate data of the rotary laser system 1 are sent to the bulldozer 2 by the data transmitter/receiver 16.

The elevation information transmitted from the data transmitter/receiver 16 is received by the transmitter/receiver 67 and the information is stored in the storage unit 63. Also, the position information from the GPS position measuring unit 57 and the tilt angle of the object 55 from the pole tilting sensor 62 are stored in the storage unit 63.

Based on the position information of the rotary laser system 1 and on the position information of the bulldozer 2 (a position where the GPS position measuring unit 57 is mounted) obtained at the GPS position measuring unit 57, the control arithmetic operation unit 61 calculates a distance between the rotary laser system 1 and the mounting pole 7 on plane coordinates. Also, from the distance thus calculated and the elevation angle, the difference in height between the rotary laser system 1 and the bulldozer 2 (i.e. the object 55) is calculated. Further, from information of height of the rotary laser system 1 from the ground surface, a height of the object 55 can be obtained. It may be designed in such manner that the amount of deviation S of the image photodetector 34 is received by the control arithmetic operation unit 61, and the elevation angle can also be calculated by the control arithmetic operation unit 61.

From mechanical positional relation between the GPS position measuring unit 57 and the blade edge 6a and from mechanical positional relation between the object 55 and the blade edge 6a, a position on real plane coordinates and a height of the blade edge 6a can be calculated. When the mounting pole 7 is tilted, the height and the position on plane coordinates of the blade edge 6a are compensated based on the tilting angle detected by the pole tilting sensor 62 and the distance between the blade edge 6a and the object 55.

The working drawing and the working height (civil engineering working data) are associated with each other and are stored in the storage unit 63. A difference of height from the blade edge 6a of the blade 6 at the coordinate point is obtained from the coordinate position determined by the GPS position measuring unit 57 and also from the working drawing and the working height by the control arithmetic operation unit 61, and control is exercised to turn the difference to zero. Specifically, by controlling the hydraulic cylinder 56 to move the blade 6 up and down, management of the civil engineering work can be carried out.

The control arithmetic operation unit 61 drives and controls the hydraulic cylinder 56 via the actuator control circuit 64 based on the civil engineering working data, and excavation and soil filling can be carried by the bulldozer 2 based on the civil engineering working data.

The movement upward or downward of the blade 6 is controlled by the control arithmetic operation unit 61, and the operator should only operate to move the bulldozer 2 while confirming the civil engineering data displayed on the display unit 66, and this extensively alleviates the burden of the work on the operator.

Because the tracking light 40 is a fan-shaped light beam, the object 55 is not deviated from the tracking light 40 even when the object 55 is moved up or down due to upward or downward movement of the blade 6, and the reflection light 40*a* can be reflected toward the rotary laser system 1.

The reflecting body provided on the object 55 may be a reflecting sheet or the like with an adequate area, and a lifting mechanism for the mounting pole 7 is not needed, and this makes it possible to attain extremely simple design.

It may be designed in such manner that the control unit 59 of the bulldozer 2 has a transmitter, that position information measured by the GPS position measuring unit 57 is transmitted to the rotary laser system 1, and that the control unit 38 of the rotary laser system 1 has position information of the object 55 and height of the object 55 is calculated.

The GPS position measuring unit 57 may be provided on the upper end of the mounting pole 7. The GPS position measuring unit 57 may be provided on the object 55 and there may be provided an arithmetic operation unit to calculate the height of the object 55 from the distance between the rotary laser system 1 and the object 55 and from the elevation angle and a receiver. As a result, a measuring system independent from the bulldozer 2 can be designed.

In the above, description has been given on a structure where the image photodetector 34 is fixed. When the image photodetector 34 is designed to rotate with the reflection mirror 28, there is no need to provide the rotary encoder 69.

Description will be given now on a second embodiment of the invention referring to FIG. 7.

In the second embodiment, civil engineering work using a plurality of bulldozers 2*a*, 2*b*, . . . is placed under management by a single rotary laser system 1.

Figure 7:
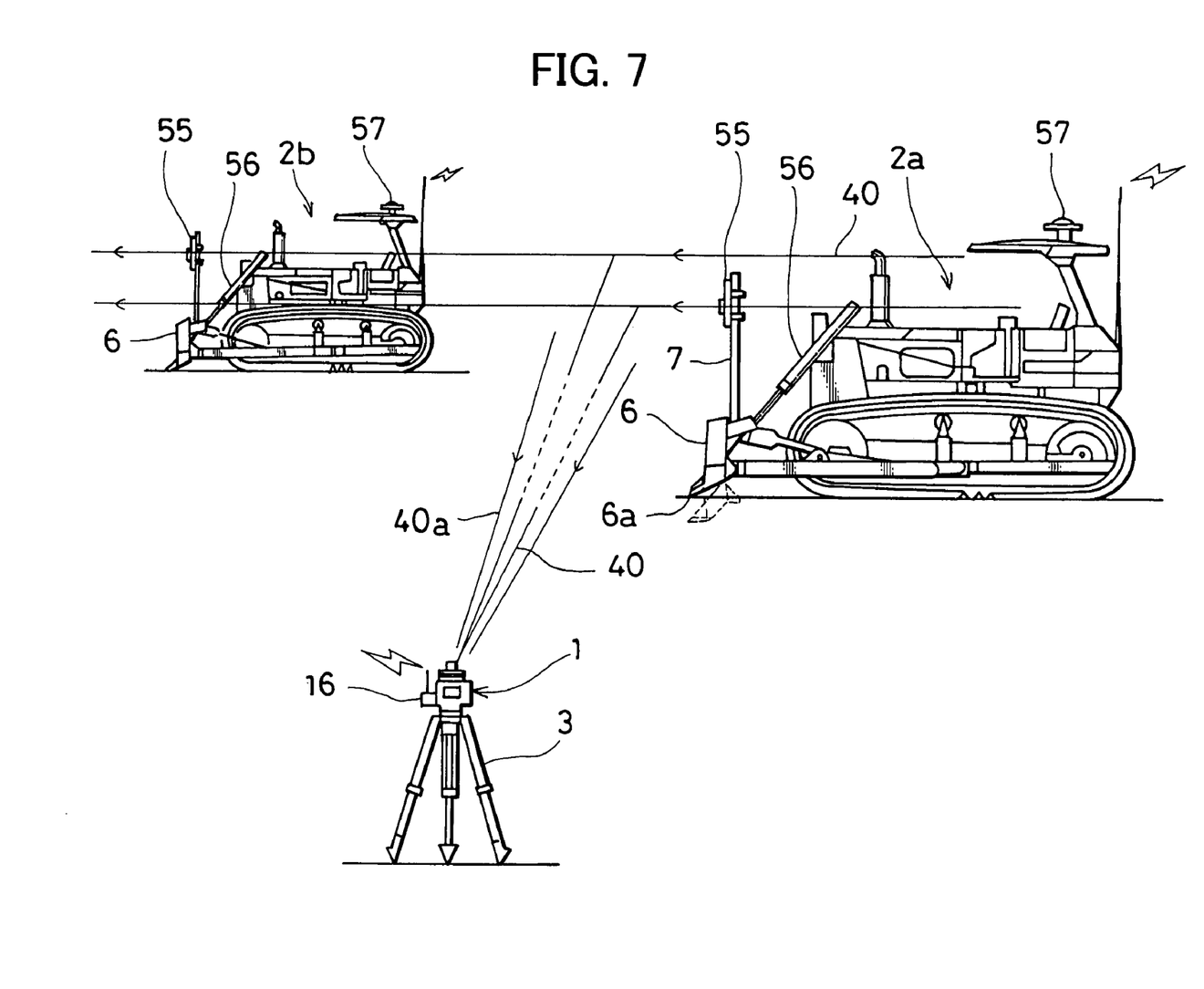
FIG. 7 is a drawing to explain a second embodiment of the present invention.

In FIG. 7, the same component shown in FIG. 1 is referred by the same symbol, and detailed description is not given here. The rotary laser system 1 and the bulldozers 2*a*, 2*b*, . . . are the same as shown in FIG. 2 to FIG. 6, and detailed description is not given here.

In the second embodiment, the rotary laser system 1 comprises an identifying means for identifying a plurality of bulldozers 2*a*, 2*b*, . . . . The bulldozers 2*a*, 2*b*, . . . have the same arrangement as the bulldozer 2 described in the above embodiment. In the following, description will be given primarily on the identifying means.

When the bulldozers 2*a*, 2*b*, . . . are to be identified, the rotary encoder 69 is provided even when the image photodetector 34 is integrally rotated with the reflection mirror 28.

A signal from the rotary encoder 69, i.e. a signal from the photodetector 73, is inputted to the control unit 38 (See FIG. 4).

For instance, when a reflection light 40*a* from the reflecting body of the object 55 on the bulldozer 2*a* enters the image photodetector 34 as shown in FIG. 7, an angle detection signal from the rotary encoder 69 is made to match a photodetection signal from the image photodetector 34 and identification data is added and is stored in the storage unit 53 for the rotary laser system. Similarly, when a reflection light 40*a* from the reflecting body of the object 55 of the bulldozer 2*b* enters the image photodetector 34, an angle detection signal from the rotary encoder 69 is made to match a photodetection signal from the image photodetector 34 and identification data is added, and this is stored in the storage unit 53 for the rotary laser system.

Therefore, the angle signal from the rotary encoder 69 when the photodetection signal from the image photodetector 34 is detected is collated with the angle stored in the storage unit 53 for the rotary laser system. As a result, it can be identified whether the reflection light 40*a* comes from the bulldozer 2*a* or from the bulldozer 2*b*.

From the data transmitter/receiver 16, communication data including elevation angle to the object 55 and the data of the position where the rotary laser system 1 is set up are transmitted together with the identification data. The transmitter/receiver 67 of each of the bulldozers 2*a* and 2*b* has an identification data identifying unit. When communication data is received, identification data is confirmed, and only the communication data with the agreed identification data is received.

By receiving the communication data, positional relation between the object 55 and the bulldozer 2 receiving the communication data can be calculated.

It is also possible to modulate the tracking light 40 by optical modulation, etc. and to send the communication data via optical communication by superimposing the communication data on the tracking light 40. In case of the optical communication, directivity is high, and it is not always necessary to transmit together with the identification data. The bulldozer 2, to which the data is to be transmitted, may be identified by a rotation angle detected by the rotary encoder 69. Only when the rotating angle detected by the rotary encoder 69 agrees with the rotation angle of the bulldozer 2 to which the data is to be transmitted, communication data may be transmitted.

Thus, the civil engineering work using a plurality of bulldozers 2*a*, 2*b*, . . . can be placed under management by a single rotary laser system 1.

It may be designed in such manner that the identification data is transmitted to the rotary laser system 1 from the bulldozer 2, and the communication data may be transmitted together with the identification data transmitted from the bulldozer 2 when communication data is transmitted by the rotary laser system 1.

What is claimed is:

1. A position measuring system, comprising a rotary laser system provided at a known point and for projecting a laser beam by rotary irradiation, an object to which said laser beam is irradiated, and a control arithmetic operation unit provided at at least one of said rotary laser system and said object, wherein said rotary laser system has a projection optical system for projecting the laser beam by rotary irradiation as a fan-shaped laser beam by spreading the laser beam in an up-to-bottom direction, an image photodetector which can identify a photodetecting position, and a photodetection optical system for guiding the laser beam reflected from said object toward said image photodetector, said object having a reflecting body to reflect the laser beam toward said rotary laser system, and a GPS position measuring unit for obtaining a position of said object, and wherein said control arithmetic operation unit calculates an elevation angle based on the photodetection position on said image photodetector and calculates a height of said reflecting body based on position information of said rotary laser system and based on the elevation angle.

2. A position measuring system according to claim 1, wherein said rotary laser system has a first data transmitter/receiver, said object has a second data transmitter/receiver, and the elevation angle and the position information of said rotary laser system are transmitted from said first data transmitter/receiver to said second data transmitter/receiver.

3. A position measuring system according to claim 2, wherein the signal transmitted and received between said first data transmitter/receiver and said second data transmitter/receiver has an identification data, and construction machines are individually identified based on said identification data.

4. A position measuring system according to claim 1, wherein said object is a construction machine, and said GPS position measuring unit is provided on said construction machine, and a working position of said construction machine is obtained.

5. A position measuring system according to claim 4, wherein said object is two or more construction machines, said rotary laser system has a rotary encoder for detecting an angle in the projecting direction of the laser beam, and said construction machines are individually identified based on a detection signal of said rotary encoder.

* * * * *